United States Patent
Banting et al.

[19]

[11] Patent Number: 5,959,537
[45] Date of Patent: Sep. 28, 1999

[54] VARIABLE TRIP FAULT INDICATOR

[75] Inventors: John Frederick Banting; Frank John Muench, both of Waukesha; Eugene Scott Knabe, Waterford, all of Wis.

[73] Assignee: McGraw-Edison Company, Houston, Tex.

[21] Appl. No.: 09/112,342

[22] Filed: Jul. 9, 1998

[51] Int. Cl.⁶ .................................................. G08B 21/00
[52] U.S. Cl. ...................... 340/664; 340/324; 340/361; 340/650; 340/253; 340/638; 340/660; 340/661; 340/663; 324/51; 324/133; 324/508; 361/59; 361/92; 361/93; 361/79
[58] Field of Search ................................... 340/664, 324, 340/361, 650, 253, 638, 660, 663, 661; 324/133, 51, 508; 361/59, 92, 93, 79

[56] References Cited

U.S. PATENT DOCUMENTS

| | | | |
|---|---|---|---|
| 3,720,872 | 3/1973 | Russell et al. | 324/133 |
| 3,735,248 | 5/1973 | Reese | 324/51 |
| 4,335,437 | 6/1982 | Wilson et al. | 364/483 |
| 4,794,332 | 12/1988 | Schweitzer, Jr. | 324/133 |
| 4,984,124 | 1/1991 | Yeh | 361/59 |
| 5,241,444 | 8/1993 | Yeh | 361/59 |
| 5,258,903 | 11/1993 | Rodriguez-Cavazos | 363/21 |
| 5,440,234 | 8/1995 | Kondo | 324/526 |
| 5,485,545 | 1/1996 | Kojima et al. | 359/22 |
| 5,537,327 | 7/1996 | Snow et al. | 364/483 |
| 5,548,279 | 8/1996 | Gaines | 340/664 |
| 5,559,500 | 9/1996 | Kase | 340/664 |
| 5,574,387 | 11/1996 | Petsche et al. | 324/772 |
| 5,576,632 | 11/1996 | Petsche et al. | 324/772 |
| 5,629,870 | 5/1997 | Farag et al. | 364/551.1 |
| 5,661,626 | 8/1997 | Takeuchi | 361/93 |
| 5,675,497 | 10/1997 | Petsche et al. | 364/485 |
| 5,714,886 | 2/1998 | Harris | 324/601 |
| 5,726,847 | 3/1998 | Dalstein | 361/93 |
| 5,734,575 | 3/1998 | Snow et al. | 364/482 |
| 5,754,383 | 5/1998 | Huppertz et al. | 361/93 |
| 5,784,233 | 7/1998 | Bastard et al. | 361/36 |
| 5,796,631 | 8/1998 | Iancu et al. | 364/492 |
| 5,805,400 | 9/1998 | Kim | 361/71 |

OTHER PUBLICATIONS

"EE's tools & toys", IEEE Spectrum, Dec. 1997, pp. 62–63.
"Fault Indicators, S.T.A.R.™ Type ER Faulted Circuit Indicator Installation Instructions s320–60–1", Dec. 1997, Cooper Power Systems, pp. 1–2.
"Fault Indicators, S.T.A.R.™ Faulted Circuit Indictors Electrostatic Reset Type 320–60" May 1997, Cooper Power Systems, pp. 1–4.
"Fault Indicators, S.T.A.R.™ Type TPR Faulted Circuit Indicator Installation Instructions s320–40–1", Dec. 1997, Cooper Power Systems, pp. 1–3.

(List continued on next page.)

Primary Examiner—Jeffery A. Hufsass
Assistant Examiner—Tai Tan Nguyen
Attorney, Agent, or Firm—Fish & Richardson P.C.

[57] ABSTRACT

In a power distribution system, a reliable, accurate, and energy efficient fault circuit indicator is provided through a microcomputer-based fault current indicator design. First, reliability is improved inherently because the microcomputer, and the software embedded therein, replace the functionality of numerous discrete, less reliable electronic components found in prior designs. Second, the embedded software is capable of placing the fault current indicator in one of a number of energy conservation states, without compromising the fault current indicator's ability to provide information relating to the occurrence of a fault. Finally, greater fault current indication accuracy is achieved by detecting excessive line current, followed by a significant drop in line voltage.

28 Claims, 6 Drawing Sheets

OTHER PUBLICATIONS

"Fault Indicators, S.T.A.R.™ Faulted Circuit Indicators Test Point Reset Type 320–40", May 1997, Cooper Power Systems, pp. 1–4.

"S.T.A.R.™ Faulted Circuit Indicators, Test Point Reset Type", Cooper Power Systems, Jan. 1998, Bulletin No. 97034.

"Fault Indicators, S.T.A.R.™ Faulted Circuit Indicators Low Voltage Reset Type 320–50", May 1997, Cooper Power Systems, pp. 1–4.

"Fault Indicators, S.T.A.R.™ Type LV Faulted Circuit Indicator Installation Instructions s320–50–1", Cooper Power Systems, pp. 1–4, May 1997.

"S.T.A.R.™ Faulted Circuit Indicators, Low Voltage Reset Type", Cooper Power Systems, Jan. 1998, Bulletin No. 97035.

VARIABLE TRIP FAULT INDICATOR

BACKGROUND OF THE INVENTION

1. Field of the Invention

The present invention relates to fault circuit indicators. More particularly, the present invention relates to a microcomputer-based fault circuit indicator design.

2. Description of Related Art

Fault circuit indicators (FCIs) are typically installed at intervals along power distribution lines, or in proximity to critical loads. FCIs are installed for the purpose of providing fault indications when a fault has occurred downline, between the FCI and a next FCI or between the FCI and a critical load. In general, FCIs are well-known in the art.

U.S. Pat. No. 5,241,444 discloses a FCI that responds to a predefined increase in current over a given period of time (e.g., 50 amps over 3 cycles). However, the response is delayed in order to give a corresponding fuse or circuit breaker time to respond. The FCI then provides a fault indication only if it detects a subsequent loss of line current.

U.S. Pat. No. 5,168,414 also describes a FCI. In this patent, the FCI registers a fault in response to an overcurrent condition in an alternating current power distribution circuit, but only after a subsequent drop in the current level below a predefined threshold, which is essentially zero.

There are a number of problems associated with prior FCI designs, including the two FCIs described above. A first problem is that prior FCI designs base their fault indications on the detection of an overcurrent condition followed by a loss of current. This is problematic because backfeed and induced currents, particularly in three-phase systems, may prevent the current flowing through the affected line from dropping to zero. In fact, backfeed and/or induced current may not significantly differ from what might be considered a normal current level. Accordingly, prior FCI designs do not consistently indicate the presence of a fault condition when, in fact, a fault condition exists.

A second problem with prior FCI designs is that they are constructed exclusively with discrete electronic components. These components are not very reliable, particularly when exposed to extremely harsh environmental conditions. Consequently, these FCIs often fail, and replacing them is costly and especially inconvenient for utility companies providing power service to large, rural areas.

Yet a third problem associated with prior FCI designs is that they are not especially energy efficient. For example, the prior designs provide fault indications for a long period of time. This tends to drain the battery providing power to the FCI. Although the batteries can be replaced, doing so can be costly and inconvenient for the reasons presented above.

In view of the foregoing problems, there is a need for an FCI design that provides more accurate fault circuit indication, as well as one that is more reliable and more energy efficient.

SUMMARY

The present invention provides for a more accurate, reliable and energy efficient fault circuit indicator. These enhancements are achieved through a microcomputer-based FCI design, wherein the microcomputer, and the software embedded therein, replace the functionality of the numerous discrete electronic components in prior designs, thereby improving the reliability of the FCI. In addition, the microcomputer and the embedded software are capable of placing the FCI into one of a number of operational states, including an energy conservation "sleep" state, which significantly prolongs the life expectancy of the battery. Moreover, the present invention, unlike prior designs, provides fault circuit indication with greater accuracy by first detecting an abnormal change in current, such as a significant rise in current over time (i.e., di/dt) or a rise in current above a predefined threshold.

Accordingly, it is an objective of the present invention to provide more accurate fault circuit indication.

It is another an objective of the present invention to provide a more reliable FCI.

It is another objective of the present invention to provide a more energy efficient FCI.

It is still another objective of the present invention to incorporate each of the above-identified enhancements into an FCI that can interface directly to the power distribution system or interface to the system through any one of a number of existing system test points.

In accordance with one aspect of the present invention, these and other objects are achieved by a fault current indicator that includes current sensing means for measuring line current and for generating a fault current signal. The indicator also includes voltage sensing means for measuring line voltage, and means for providing a fault indication as a function of the fault current signal followed by a loss of voltage.

In accordance with another aspect of the present invention, these and other objects are achieved by a fault current indicator that includes a current sensing circuit connected to a test point along the power distribution system. The current sensing circuit includes means for inductively measuring line current, wherein the current sensing circuit includes a fault current detection circuit for generating a fault current signal in response to the measured line current. The fault current indicator also includes a voltage sensing circuit connected to the test point, wherein the voltage sensing circuit includes a line voltage measurement circuit; a microcomputer including means for receiving the fault indication signal from the current sensing circuit and means for receiving the line voltage measurement from the voltage sensing circuit. Finally, the fault current indicator includes a fault indicator operatively connected to the microcomputer, wherein the microcomputer further includes means for activating the fault indicator if it is determined that a fault current signal has been generated followed by a loss of line voltage.

In accordance with yet another aspect of the present invention, these and other objects are achieved by a method for generating a fault current indication. The method comprises the steps of measuring the line current and generating a fault current signal based on the line current measurement. The line voltage is then measured and a fault indication is provided as a function of the fault current signal if followed by a loss of voltage.

In accordance with another aspect of the present invention, these and other objects are achieved by a method for generating a current indicator. The method comprises the steps of inductively measuring line current, and generating a fault current signal in response to the measured line current. The line voltage is then measured through a test point, and a fault indicator is activated if it is determined that a fault current signal has been generated followed by a loss of line voltage.

BRIEF DESCRIPTION OF THE DRAWINGS

In the text which follows, the invention is explained with reference to illustrative embodiments, in which.

DETAILED DESCRIPTION OF THE INVENTION

Figure 1:
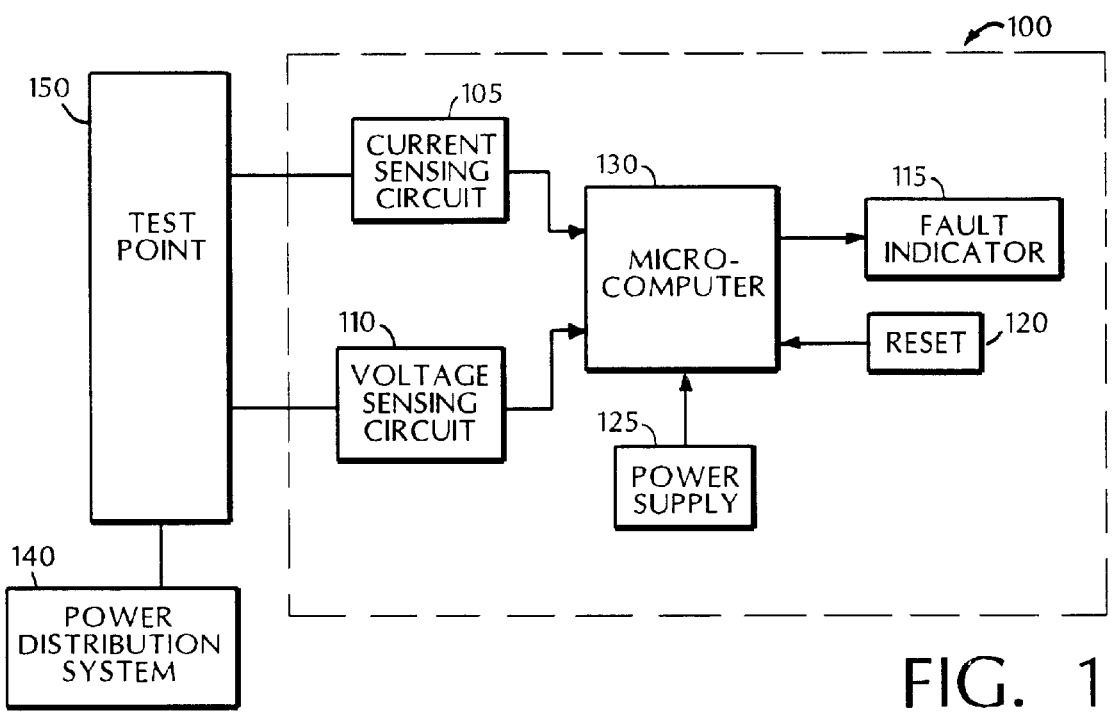
FIG. 1 shows a general circuit depicting the present invention connected to a power distribution system test point.

For a better understanding of the present invention, the following detailed description refers to a number of accompanying drawings, wherein the various embodiments of the present invention are illustrated, and wherein the reference numbers appearing in the drawings are used consistently throughout the following discussion.

FIG. 1 is a block diagram of a variable trip fault circuit indicator (FCI) 100 in accordance with a preferred embodiment of the present invention. As shown, the FCI 100 includes a current sensing circuit 105, a voltage sensing circuit 110, a fault indicator circuit 115, a fault indicator reset circuit 120, a power supply 125 and a microcomputer 130.

FIG. 1 shows that the FCI 100 is connected to a power distribution system 140 through any one of a number of existing test points, such as test point 150. Although one skilled in the art will recognize that there are other ways to connect a FCI to the power distribution system, there are several advantages in doing so through an existing test point. The most obvious advantage is that test points, in general, are easily accessible. Accordingly, accessing an FCI connected thereto, for the purpose of reading, resetting or otherwise maintaining the FCI, would also be easy.

Figure 2:
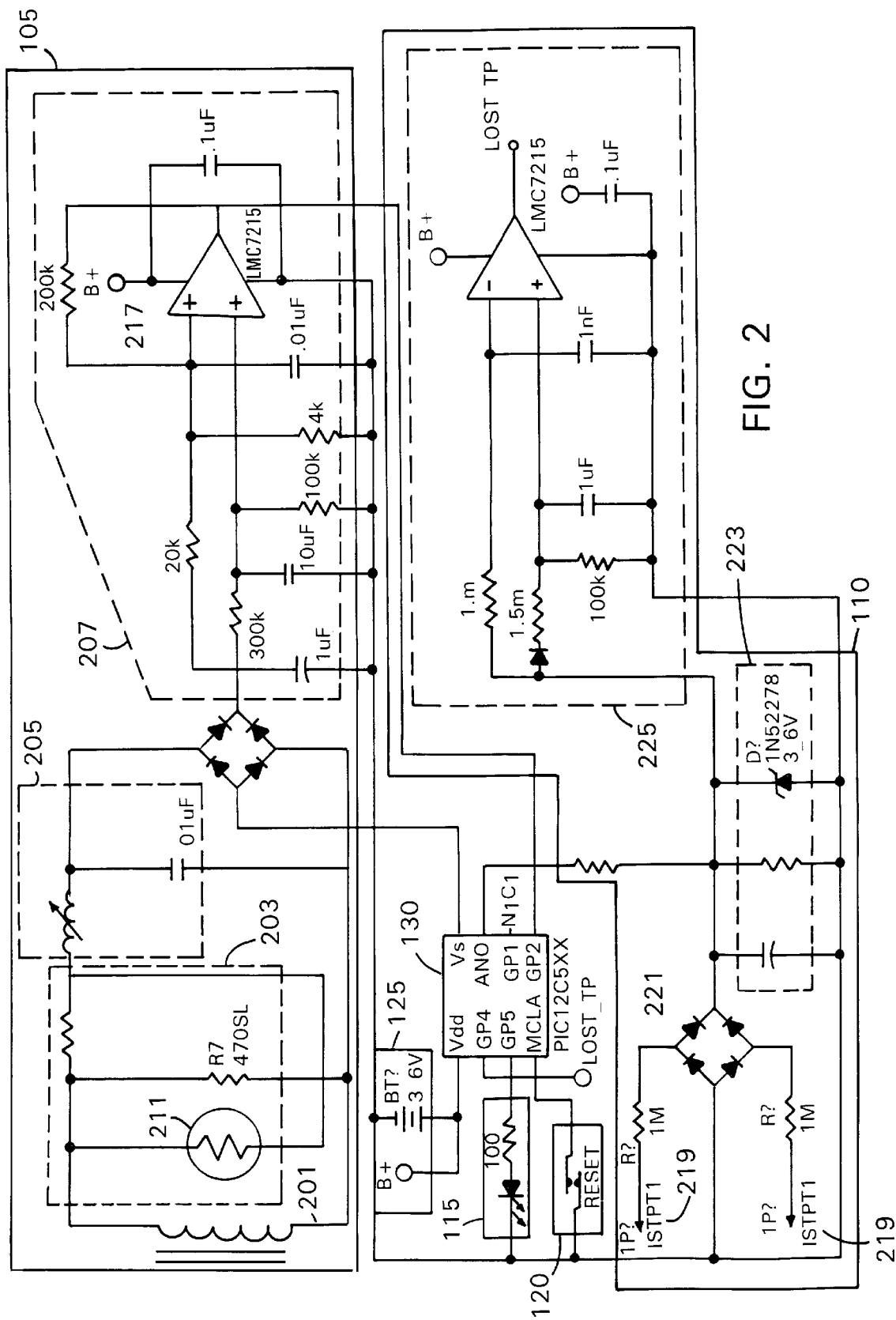
FIG. 2 shows a first embodiment of the present invention.

A more detailed implementation of the FCI 100 is illustrated in FIG. 2. As explained above, the FCI 100 includes a current sensing circuit 105. In FIG. 2, the current sensing circuit 105 is shown as comprising a transformer 201, a temperature compensation circuit 203, a low-pass filter 205, a current detection circuit 207 and a diode bridge 209. The transformer 201 taps the line current from the power distribution system cable passing through the test point. The current then passes from the transformer 201 to the temperature compensation circuit 203. The temperature compensation circuit 203 includes a thermistor 211. The temperature compensation circuit 203 provides temperature compensation for the transformer coil. Next, the current passes through the low-pass filter 205, which removes high frequency components from the current signal, and the diode bridge 209, which rectifies the current signal. Finally, the current passes to the current detection circuit 207, which includes an operational amplifier 217. When the rate of change in current (e.g., di/dt) rises above a certain level, defined by the values associated with the various resistors and capacitors biasing the operational amplifier 217, the operational amplifier 217 outputs a signal to alert the microcomputer 130.

The voltage sensing circuit 110 comprises a pair of test point connectors 219, a diode bridge 221, a filter and signal conditioning circuit 223 and a loss of voltage circuit 225. The test point connectors 219, as the name suggests, tap into the test point for receiving line voltage. The diode bridge 221 then rectifies the voltage signal. The filter and signal conditioning circuit 223 includes a resistor, a capacitor and a zener diode. The filter and signal conditioning circuit 223 prevents the nominal voltage signal from overdriving the microcomputer 130. The nominal voltage signal is used for tracking line voltage. The loss of voltage circuit 225 also employs an operational amplifier 227. If there is a loss of line voltage, the operational amplifier 227 outputs a loss of voltage signal to alert the microcomputer 130.

As previously mentioned, the FCI 100 includes a fault indicator circuit 115 and a fault indicator reset circuit 120. The fault indicator circuit 115 could be implemented in any number of different ways. In a preferred embodiment, and as illustrated in FIG. 2, the fault indicator circuit 115 is implemented using a current limiting resistor and a light emitting diode (LED). The fault indicator reset circuit 120 might also be implemented in any number of different ways. In a preferred embodiment, however, it is implemented using a manual, magnetically operated read switch.

The primary functions of the microcomputer 130 are to receive the various output signals from the current and voltage sensing circuits and to execute the fault circuit indicator (FCI) control algorithm. More specifically, the microcomputer 130 receives the nominal voltage and loss of voltage signals from the voltage sensing circuit 110, the output signal from the current sensing circuit 105, and the reset signal from the fault indicator reset circuit 120. Then, based on these signals, the microcomputer 130 executes the FCI control algorithm. By employing the fault circuit indicator control algorithm, the microcomputer 130 is able to control and/or provide fault indication (i.e., the operation of the fault indicator circuit 115), interrogation, in-rush restraint, reset restraint, and energy conservation. The FCI control algorithm will be described in greater detail below.

In general, the FCI 100 has four operating states: a sleep/reset state, a wake-up state, a fault indication state, and a quiescent state. The sleep/reset state is essentially a power conservation state, wherein the FCI 100 monitors the line voltage (i.e., nominal voltage) and current. If fault current is detected, the FCI 100 transitions to the wake-up state. A drop in voltage below a predefined level, subsequent to detecting a fault current, causes the FCI 100 to transition from the wake-up state to the fault indication state. While in the fault indication state, the FCI 100 provides some indication that a fault has been detected, such as a flashing LED. Assuming the FCI 100 is not manually reset or re-energized, the FCI 100 remains in the fault indication state for a predefined period of time, for example, 2 hours, before transitioning to the quiescent state. The FCI 100 stays in the quiescent state until the FCI is interrogated, manually reset, or re-energized, after which, the FCI 100 returns to the sleep/reset state.

FIGS. 3A through 3D illustrate a particular technique for implementing the FCI control algorithm. Initially, the FCI control algorithm places the FCI 100 in the sleep/reset state, as illustrated by step 301, in FIG. 3A. The FCI control algorithm places the FCI 100 in the sleep/reset state for the purpose of conserving energy. During the sleep/reset state, the FCI 100 employs its voltage sensing circuit 110 to monitor the line voltage. The FCI 100 monitors line voltage at this point for the purpose of determining whether any recloser operations have occurred. If it is determined that the line voltage was lost during this state, the FCI 100 registers the event, for example, by setting a loss of voltage status flag.

As explained above, the FCI 100 employs the current sensing circuit 105 to detect fault current. If the current sensing circuit 105 does, in fact, detect fault current, the current sensing circuit 105 alerts the microcomputer 130 and the FCI control algorithm causes the FCI 100 to transition from the sleep/reset state to the wake-up state as illustrated by step 303. The FCI 100 then determines whether the loss of voltage status flag has been set, in accordance with decision step 305. If it is determined that the loss of voltage status flag is set, in accordance with the "YES" path out of decision step 305, then it is further determined that the condition causing the FCI 100 to transition to the wake-up state was due to in-rush current from, for example, a recloser operation. In accordance with step 307, the FCI 100 ignores the in-rush current, and the FCI control algorithm places the FCI 100 back into the sleep/reset state. If, however, it is determined that the loss of voltage status flag is not set, in accordance with the "NO" path out of decision step 305, the FCI control algorithm determines whether the current exceeds a predefined minimum threshold, in accordance with decision step 309. An exemplary minimum current threshold may be 200 amps. If it is determined that the current does not exceed the predefined minimum threshold, in accordance with the "NO" path out of decision path 309, the FCI control algorithm determines that the abnormal current condition was due to a transient fluctuation, as shown by step 311. If, however, it is determined that the current exceeds the minimum threshold, in accordance with the YES path out of decision step 309, the FCI control algorithm goes into a wait period in accordance with step 315. If there is a fault condition present, the wait period allows time for the line voltage to drop. A sufficient period of time for the wait period may be 500 msec.

The FCI 100 now monitors the test point for a loss of voltage signifying the presence of a fault condition, in accordance with decision step 317. More specifically, the FCI 100 determines whether the line voltage drops below a nominal voltage level by a predefined amount or percentage. In a preferred embodiment, the FCI 100 is looking for a voltage drop below 60% of the nominal voltage level. If a voltage drop occurs that is not less than 60% of the nominal voltage, in accordance with the "NO" path out of decision step 317, the FCI 100 determines that the abnormal current condition was due to a high current transient, as illustrated in step 319. If, however, the line voltage drops below 60% of the nominal voltage, in accordance with the "YES" path out of decision step 317, the FCI 100 determines that the abnormal current condition was, in fact, due to a fault current condition. Accordingly, the FCI control algorithm sets a fault condition status flag, and causes the FCI 100 to transition from the wake-up state to the fault indication state, as shown by step 321.

In the fault indication state, the FCI control algorithm causes the fault indication 115 to strobe the LED indicator, as shown by step 323. As previously stated, the FCI remains in the fault indication state for a predefined period of time, for example, 2 hours. During this time, the FCI 100 continuously determines whether that time period has expired, in accordance with decision step 325. If the time period has not expired in accordance with the "NO" path out of decision step 325, the FCI 100 remains in the fault indication state and the LED continues to strobe. Though it is not shown in FIG. 3A, the LED stops strobing and the FCI control algorithm cause the FCI 100 to transition back to the sleep/reset state if, during the fault indication state, the system voltage is restored or the FCI 100 is manually reset. If the time period does elapse, in accordance with the "YES" path out of decision step 325, the FCI control algorithm causes the FCI 100 to transition from the fault indication state to the quiescent state in accordance with step 327.

The quiescent state is also a power conservation state. Accordingly, the FCI control algorithm prevents the LED from strobing during the quiescent state. This prolongs the life of the battery powering the FCI 100. However, while in the quiescent state, the fault condition status flag remains set, therefore the FCI 100 retains information indicating that a fault current condition was detected.

The FCI 100 remains in the quiescent state until system power is restored, the FCI 100 is interrogated, or the FCI 100 is manually reset. Accordingly, the FCI 100 must determine whether any one of these events has occurred, in accordance with decision step 329. If none of the aforementioned events have occurred, in accordance with the "NO" path out of decision step 329, the FCI 100 remains in the quiescent state. If, however, one of these events does occur, in accordance with the "YES" path out of decision step 329, the FCI control algorithm causes the FCI 100 to transition from the quiescent state back to the sleep/reset state. It should be noted that in accordance with a preferred embodiment of the present invention, the FCI control algorithm will cause the LED to strobe for a brief period (e.g., 2 minutes) if any of the aforementioned events occurs, and prior to transitioning the FCI 100 back to the sleep/reset state period.

Figure 3A:
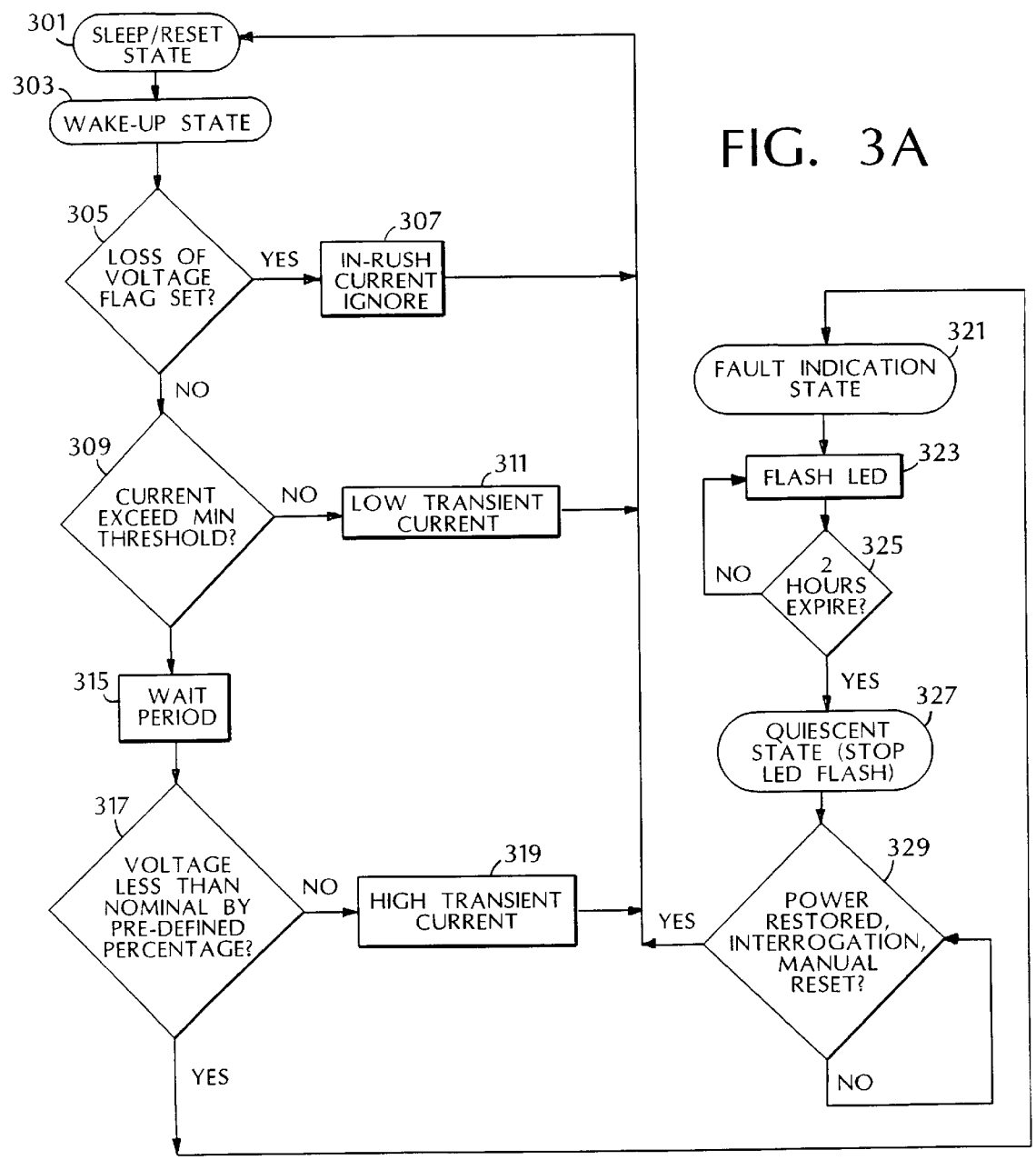
FIGS. 3A–3D illustrate particular techniques associated with the fault current indicator control algorithm.
Figure 3B:
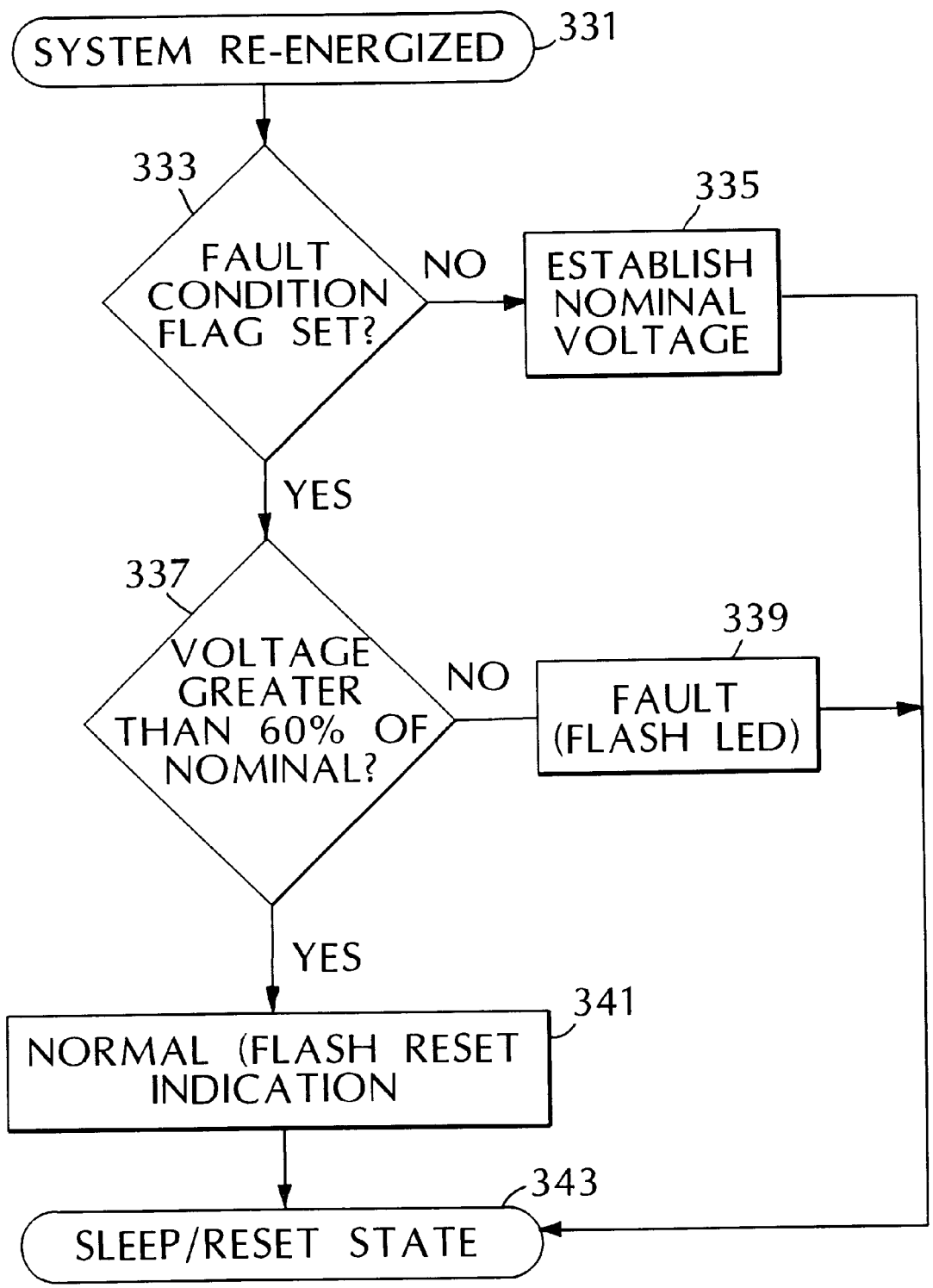

If at any point during the process illustrated in FIG. 3A, the system is de-energized (i.e., the system experiences a loss of voltage) and is then subsequently re-energized, the FCI control algorithm causes the FCI 100 to transition back to the sleep/reset state. FIG. 3B illustrates a specific technique for controlling the FCI 100 should such an event occur. For example, if the system is re-energized, as shown in step 331, the FCI 100 first determines whether the aforementioned fault condition status flag is set in accordance with decision step 333. If it is determined that the fault condition status flag is not set, in accordance with the "NO"

path out of decision step 333, the FCI 100 reestablishes a nominal voltage level through the voltage sensing circuit 110, as shown by step 335. The FCI control algorithm then causes the FCI 100 to transition back to the sleep/reset state. However, if the fault condition status flag is set in accordance with the "YES" path out of decision step 333, the FCI 100 determines whether the line voltage has been restored to a point where it is now greater than a predefined percentage of the nominal voltage level, in accordance with decision step 337. As previously stated, the predefined percentage of the nominal voltage level is 60% in accordance with a preferred embodiment of the present invention.

By determining whether the line voltage is greater than or less than 60% of the nominal voltage level, the FCI 100 establishes whether a normal condition now exists or a fault condition now exists. If, for example, the FCI 100 determines that the line voltage is not greater than 60% of the nominal voltage level, in accordance with the "NO" path out of decision step 337, thereby indicating the continued presence of a fault condition, the FCI control algorithm causes the FCI 100 to transition to or remain in the fault indication state, wherein the LED strobes for a predefined period of time, as shown by step 339. If, however, the line voltage is greater than 60% of the nominal voltage level, in accordance with the "YES" path out of decision step 337, the FCI control algorithm causes the LED to provide some indication that normal conditions have been restored, in accordance with step 341. Thereafter, the FCI control algorithm causes the FCI 100 to transition to the sleep/reset state, in accordance with step 343.

In an alternative embodiment, the FCI control algorithm may cause the FCI 100 to return to the sleep/reset state, wherein the fault condition status flag remains set. The FCI 100 would retain the fault condition status flag for a short period of time (e.g., 12 hours). During this period, the FCI 100 could easily be interrogated.

Figure 3C:
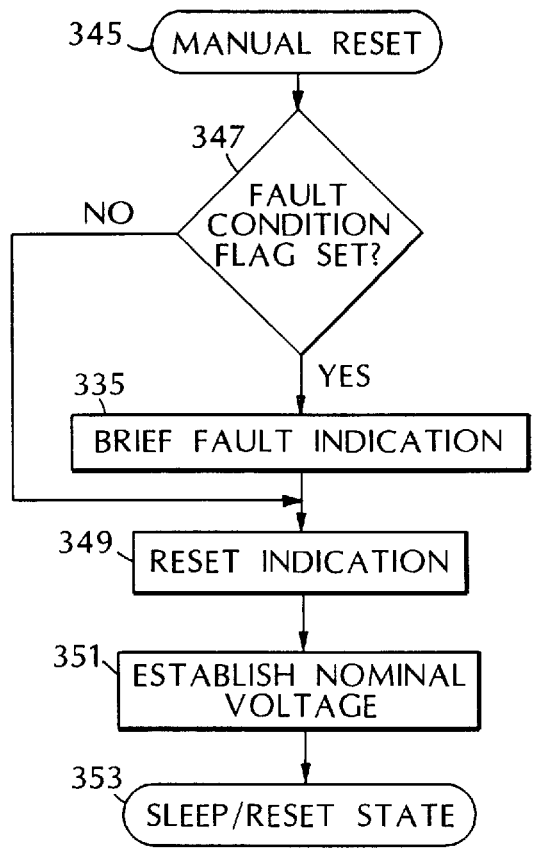

It was also previously mentioned that the FCI 100 could, at any time, be manually reset. FIG. 3C illustrates a specific technique whereby the FCI 100 is manually reset, in accordance with step 345. If the FCI 100 is manually reset, a determination is made as to whether the fault condition status flag is set in accordance with decision step 347. If it is determined that the fault condition status flag is not set, in accordance with the "NO" path out of decision step 347, thereby indicating that no fault condition is present, the FCI control algorithm causes the fault indication circuit 115 to provide an indication that the FCI 100 is to be reset, as shown by step 349. Nominal system voltage is then reestablished, in accordance with step 351, before the FCI control algorithm causes the FCI 100 to transition to the sleep/reset state as shown by step 353.

Figure 3D:
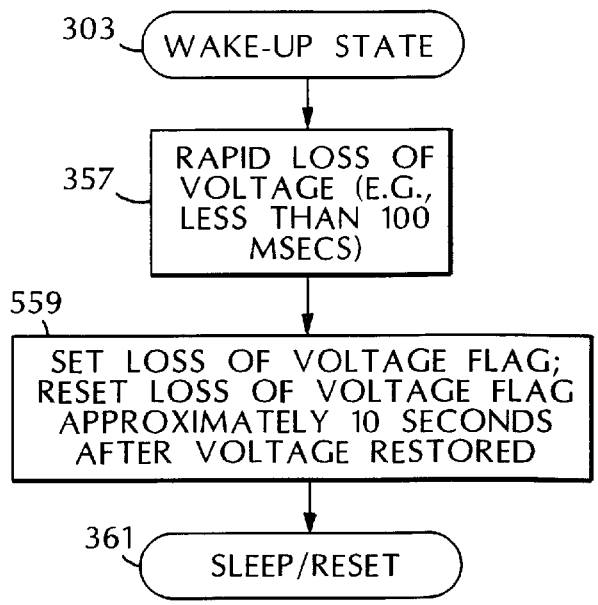

It was also stated above that the FCI 100 is capable of recognizing a loss of voltage event. As shown in FIG. 3D, step 357, if the loss of voltage circuit 225 detects a rapid loss of line voltage at the test point without a concurrent increase in current, the FCI control algorithm causes the loss of voltage status flag to be set. Once the line voltage is restored, following the end of the recloser operation, the FCI control algorithm resets the loss the voltage status flag after approximately 10seconds, in accordance with step 359. The FCI control algorithm then causes the FCI 100 to transition to the sleep/reset state, as illustrated in step 361.

Figure 4:
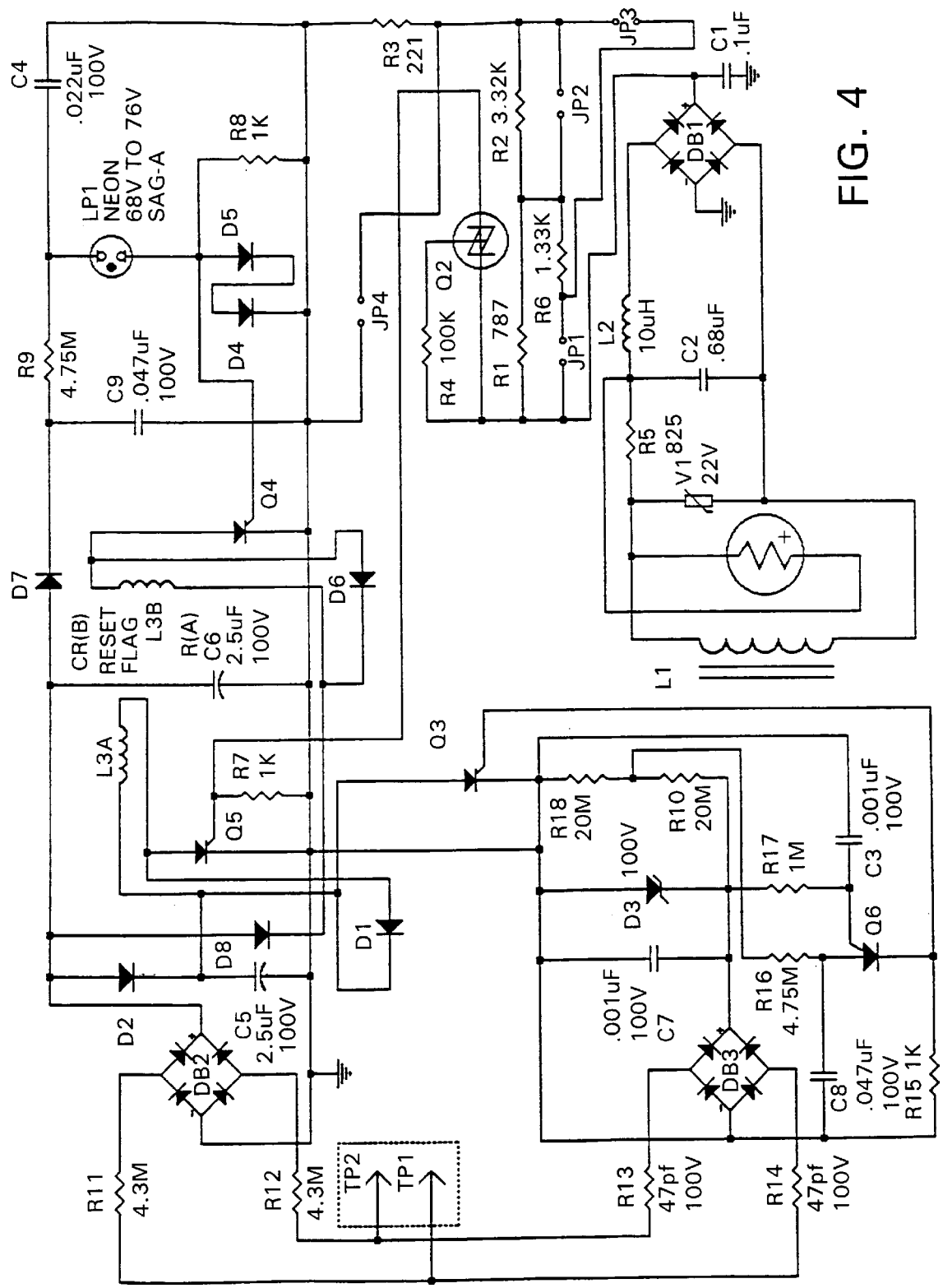
FIG. 4 shows a second embodiment of the present invention.

FIG. 4 illustrates an alternative embodiment of the present invention. More specifically, FIG. 4 illustrates an FCI 400. Like the FCI 100, illustrated in FIGS. 1 and 2, the FCI 400 provides fault indication based on an abnormal change in current followed by a loss of line voltage. However, unlike the FCI 100, the FCI 400 obtains line voltage electrostatically from the power distribution system cable and not through an existing test point.

In FIG. 4, the FCI 400 is shown to include a power supply, a status flag setting circuit, a status flag reset circuit, an in-rush restraint circuit, a current trip level setting circuit, a current sensing circuit, and a pair of brass plates. The brass plates are situated in close proximity to the power distribution system cable. Accordingly, the voltage across the cable and the electric field surrounding the cable cause a charge to build up across the brass plates. The charge which builds up across the brass plates is representative of the line voltage. It should be noted that the voltage which builds up across the brass plates is also used to drive the power supply. Hence, a battery is not needed for the FCI 400. The power supply comprises the diode ridge DB2, the diodes D2 and D8, resistors R11 and R12, and capacitors C5 and C6. The power supply drives the status flag set circuit and the status flag reset circuit. The status flag set circuit comprises inductor L3A, resistor R7, diode D1 and transistor Q5. The status flag reset circuit comprises inductor L3B, diodes D4, D5, D6 and D7, resistors R8 and R9 and capacitors C4 and C9.

The circuit which establishes the current trip level includes a number of jumper connections. As shown in FIG. 4, the jumper connections include JP1, JP2, JP3 and JP4. As one skilled in the art will readily appreciate, the current trip level depends upon the jumper connections which are short circuited and the jumper connections which are open circuited. The current trip level setting circuit also includes resistors R1, R2, R3, R4 and R6, and transistor Q2.

The in-rush restraint circuit works by discharging the capacitors associated with the power supply. The in-rush restraint circuit includes the diode bridge B3; the resistors R10, R13, R14, R16 and R18; the capacitors C3, C7 and C8; zener diode D3 and transistors Q3 and Q6.

The current sensing circuit includes a transformer L1, a temperature compensation circuit, a low pass filter, the diode bridge DB1 and capacitor C1. A temperature compensation circuit, in turn, comprises the thermistor, the varistor V1 and resistor R5. The low pass filter comprises inductor L2 and capacitor C2.

It should be noted that the alternative embodiment illustrated in FIG. 4 does not include a microcomputer as does the embodiment illustrated in FIGS. 1 and 2. However, it will be understood that the embodiment illustrated in FIG. 4 could be adapted to include a microcomputer.

The present invention has been described with reference to a few exemplary embodiments. However, it will be readily apparent to those skilled in the art that is possible to embody the invention in specific forms other than the exemplary embodiments described above, and that this may be done without departing from the spirit of the invention. The exemplary embodiments described hereinabove are merely illustrative and should not be considered restrictive in any way. The scope of the invention is given by the appended claims, rather than the preceding description, and all variations and equivalents which fall within the range of the claims are intended to be embraced therein.

What is claimed is:

1. In a power distribution system, a fault current indicator comprising:

current sensing means for measuring line current and for generating a fault current signal;

voltage sensing means for measuring line voltage; and means for providing a fault indication as a function of the fault current signal followed by a loss of voltage.

2. The fault current indicator of claim 1, wherein said fault current indicator is connected to a power distribution system test point, and wherein said current sensing means comprises:

means for inductively measuring line current.

3. The fault current indicator of claim 2, wherein said current sensing means further comprises:

means for determining whether a change in line current over a period of time exceeds a pre-defined minimum rate of change.

4. The fault current indicator of claim 2, wherein said current sensing means further comprises:

means for determining whether line current magnitude exceeds a predefined threshold.

5. The fault current indicator of claim 1, wherein said voltage sensing means comprises:

means for measuring line voltage directly from a test point connected to said power distribution system.

6. The fault current indicator of claim 1, wherein said voltage sensing means comprises:

means for measuring line voltage electrostatically from a power distribution system cable.

7. The fault current indicator of claim 1, wherein said means for providing a fault indication as a function of the fault current signal followed by a loss of voltage comprises:

means for comparing a present line voltage and a nominal line voltage;

means for determining whether the present line voltage is greater than, less than or equal to a pre-defined percentage of the nominal line voltage.

8. In a power distribution system, a fault current indicator comprising:

a current sensing circuit connected to a test point along the power distribution system, wherein said current sensing circuit includes means for inductively measuring line current, and wherein said current sensing circuit includes a fault current detection circuit for generating a fault current signal in response to the inductively measured line current;

a voltage sensing circuit connected to the test point, wherein said voltage sensing circuit includes a line voltage measurement circuit;

a microcomputer including means for receiving the fault indication signal from said current sensing circuit and means for receiving the line voltage measurement from said voltage sensing circuit; and a fault indicator operatively connected to said microcomputer, wherein said microcomputer further includes means for activating said fault indicator if it is determined that a fault current signal has been generated followed by a loss of line voltage.

9. The fault current indicator of claim 8, wherein the fault current detection circuit comprises:

means for determining whether a rate of change in the line current exceeds a pre-defined minimum rate of change in line current; and means for generating the fault current signal if the rate of change in the line current exceeds the minimum rate of change in line current.

10. The fault current indicator of claim 8, wherein the fault current detection circuit comprises:

means for determining whether line current magnitude exceeds a predefined magnitude threshold; and means for generating the fault current signal if the line current magnitude exceeds the pre-defined magnitude threshold.

11. The fault current indicator of claim 8, wherein said means for activating said fault indicator comprises:

means for determining whether the line voltage measurement drops below a nominal voltage level by a pre-defined amount.

12. The fault current indicator of claim 8, wherein said microcomputer further comprises:

in-rush restraint means for preventing the activation of the fault indication means if the fault current signal generated by said current sensing circuit was due to in-rush current.

13. The fault current indicator of claim 12, wherein said voltage sensing circuit further comprises a loss of voltage detection circuit, and wherein said in-rush restraint means comprises means for determining whether the voltage sensing circuit detected a loss of voltage prior to the generation of the fault current signal.

14. The fault current indicator of claim 8, wherein said microcomputer further comprises:

energy conservation means for limiting the amount of time the fault indicator is active.

15. The fault current indicator of claim 14, wherein said energy conservation means comprises:

means for deactivating the fault indicator after a pre-defined period of time; and interrogation means for storing fault indication information in a memory upon deactivation of the fault indicator.

16. The fault current indicator of claim 8, wherein said microcomputer further comprises:

reset restraint means for maintaining fault indication data in a memory for a period of time following a resetting of said fault current indicator.

17. In a power distribution system, a method for generating a fault current indication comprising the steps of:

measuring line current;

generating a fault current signal based on the line current measurement;

measuring line voltage; and providing a fault indication as a function of the fault current signal if followed by a loss of voltage.

18. The method of claim 17, wherein said step of measuring line current comprises the step of:

inductively measuring line current.

19. The method of claim 17, wherein said step of measuring line voltage comprises the step of:

measuring line voltage directly from a test point connected to said power distribution system.

20. The method of claim 17, wherein said step of measuring line voltage comprises the step of:

measuring line voltage electrostatically from a power distribution system cable.

21. In a power distribution system, a method of generating a current indicator comprising the steps of:

inductively measuring line current;

generating a fault current signal in response to the measured line current;

measuring line voltage through a test point connected to the power distribution system; and activating a fault indicator if it is determined that a fault current signal has been generated followed by a loss of line voltage.

22. The method of claim 21, wherein said step of generating a fault current signal in response to the measured line current comprises the steps of:

determining whether a rate of change in line current exceeds a pre-defined minimum rate of change in line current; and generating the fault current signal if the rate of change in the line current exceeds the maximum rate of change in line current.

23. The method of claim 21, wherein said step of generating a fault current signal in response to the measured line current comprises the steps of:

determining whether line current magnitude exceeds a pre-defined magnitude threshold; and generating the fault current signal if the line current magnitude exceeds the pre-defined magnitude threshold.

24. The method of claim 21 further comprising the steps of:

determining whether the fault current signal was generated as a result of in-rush current;

preventing activation of the fault indicator if the fault current signal generated by said current sensing circuit was due to in-rush current.

25. The method of claim 24, wherein said step of determining whether the fault current signal was generated as a result of in-rush current comprises the step of:

determining whether a loss of voltage occurred prior to the generation of the fault current signal.

26. The method of claim 21 further comprising the step of:

limiting the amount of time the fault indicator is active.

27. The method of claim 26, wherein said step of limiting the amount of time the fault indicator is active comprises the steps of:

deactivating the fault indicator after a pre-defined period of time; and storing fault indication information in a memory upon deactivation of the fault indicator.

28. The method of claim 21 further comprising the step of:

maintaining fault indication data in a memory for a period of time following a resetting of said fault current indicator.

* * * * *